(No Model.) 7 Sheets—Sheet 2.

J. H. PENDLETON.
CABLE RAILWAY.

No. 387,907. Patented Aug. 14, 1888.

WITNESSES:
John F. Nelson.
Emma Arthur.

INVENTOR.
John H. Pendleton
BY Knight Bros
ATTORNEYS.

(No Model.) 7 Sheets—Sheet 3.

J. H. PENDLETON.
CABLE RAILWAY.

No. 387,907. Patented Aug. 14, 1888.

Fig. 4.

WITNESSES:
John F. Nelson
Emma Arthur

INVENTOR
John H. Pendleton
BY Knight Bros.
ATTORNEYS.

(No Model.) 7 Sheets—Sheet 5.

J. H. PENDLETON.
CABLE RAILWAY.

No. 387,907. Patented Aug. 14, 1888.

WITNESSES:
John F. Nelson.
Emma Arthur.

INVENTOR:
John H. Pendleton
BY Knight Bros.
ATTORNEYS.

(No Model.) 7 Sheets—Sheet 6.

J. H. PENDLETON.
CABLE RAILWAY.

No. 387,907. Patented Aug. 14, 1888.

WITNESSES:
John F. Nelson
Emma Arthur

INVENTOR:
John H. Pendleton
BY Knight Bros.
ATTORNEYS.

(No Model.) 7 Sheets—Sheet 7.

J. H. PENDLETON.
CABLE RAILWAY.

No. 387,907. Patented Aug. 14, 1888.

WITNESSES:
John F. Nelson
Emma Arthur

INVENTOR
John H. Pendleton
BY Knight Bros.
ATTORNEYS.

UNITED STATES PATENT OFFICE.

JOHN H. PENDLETON, OF BROOKLYN, ASSIGNOR TO THE RAPID TRANSIT CABLE COMPANY, OF NEW YORK, N. Y.

CABLE RAILWAY.

SPECIFICATION forming part of Letters Patent No. 387,907, dated August 14, 1888.

Application filed December 19, 1887. Serial No. 258,344. (No model.)

*To all whom it may concern:*

Be it known that I, JOHN H. PENDLETON, a citizen of the United States, residing at Brooklyn, county of Kings, and State of New York, have invented certain new and useful Improvements in Cable Railways, of which the following is a full, clear, and exact specification.

One object of my invention is an effective, practicable, and mechanical means for conveying cable-railway cars across other cable railways running in the same plane without the employment of locomotives and without causing any appreciable loss of time.

Another object of the invention is to provide suitable mechanism for "fetching" a cable-railway car from one track onto a neighboring or an adjacent track without interfering with the running of the cable or the passage of cars on either of said tracks.

A further object of my invention is to provide automatic and effective mechanism for conveying the cars around abrupt and other curves without the employment of auxiliary cables or the like, or without causing the traction-cable to pass around a series of small pulleys arranged to conform to the radius of the curve, as heretofore practiced; and a still further object of my invention is to supply motive power to all of these devices for operating them from the same source of energy.

With these objects in view my invention consists of a flexible tongue or strip which is provided with means for engaging with a projection or the like on the car and which follows a track curved to correspond with the curve or curves of the wheel-rails, motion being imparted to the said strip or tongue for thrusting it forward and drawing it back with the car attached by any suitable engine, whose stroke need be but very small in comparison with the thrust of the tongue, the difference being made up by reason of the said tongue being connected with the piston of the engine through the medium of a single rope passing around a series of sheaves, whereby the thrust of the tongue is approximately equal to the stroke of the piston multiplied by twice the number of folds in the rope.

Of course in cases where the car to be fetched is not around a curve or on another track—such, for instance, as a straight crossing—it will not be necessary to have the tongue flexible, and, in fact, in such cases it is far better to have it perfectly rigid; but these features, together with various other features of novelty, will be more fully described hereinafter with reference to the accompanying drawings, in which—

Fig. 1ª is a detail perspective view of the switch mechanism. Figs. 2 and 3 show the mechanism applied to cross-tracks, Fig. 2 being a vertical longitudinal section of the cross-tunnel, showing the four tunnels for the up and down tracks in cross section, and showing at one end of the cross tunnel the grip released from the cable and at the other the point of the tongue, Fig. 7 is a longitudinal section of the engine employed for operating the device, showing the system of valves and "shut-offs" and the manner of connecting the piston with the system of pulleys or sheaves, also showing the relation of the engine to the tongue.

Figures 1, 1A, 6:
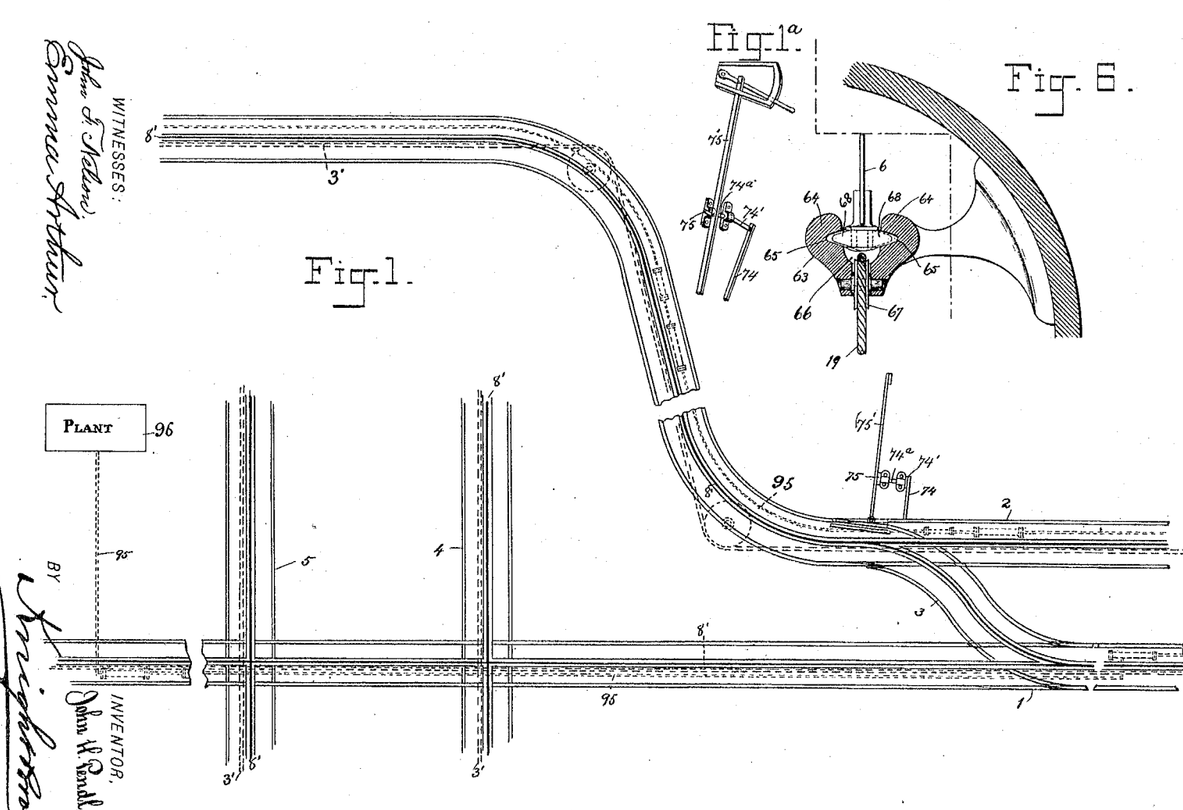
Figure 1 shows a system of railways crossing one another with switches and curves and the plant from which all of the operating-engines and auxiliary reservoirs are supplied with pressure.
Fig. 6 is a transverse section of a portion of the tunnel, showing the flexible tongue in cross-section, and also the track employed for guiding said tongue around curves and through switches.
Figure 1:
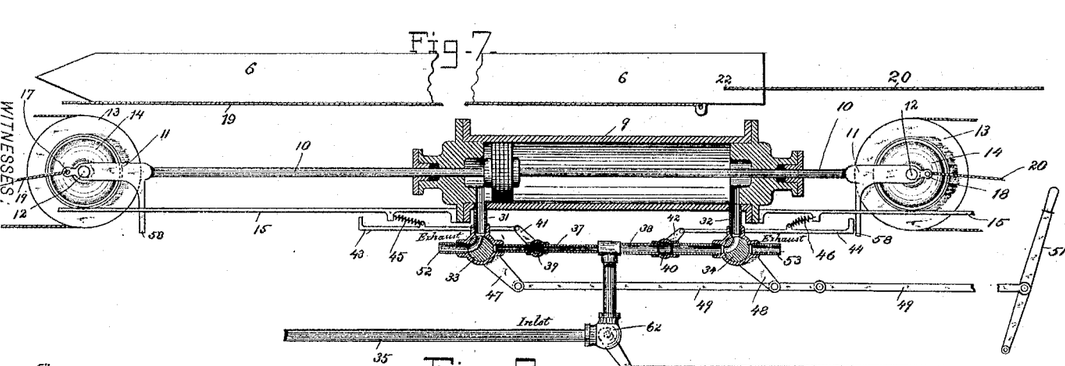

1 represents a line running in one direction, and 2 represents a line running in the opposite direction; or the two may represent the up- and-down tracks with a cross-over track, 3, between them, the track 2 having a curve which would be very difficult to pass by means of the mechanism previously in vogue, and the track or line 1 has two lines, 4 5, crossing it, which complication of tracks necessitates the dropping of one of the main traction-cables, 3', and consequently there has to be employed an auxiliary power for clearing these crossings, which power has heretofore been furnished by either horses or a steam-engine.

Figure 2:
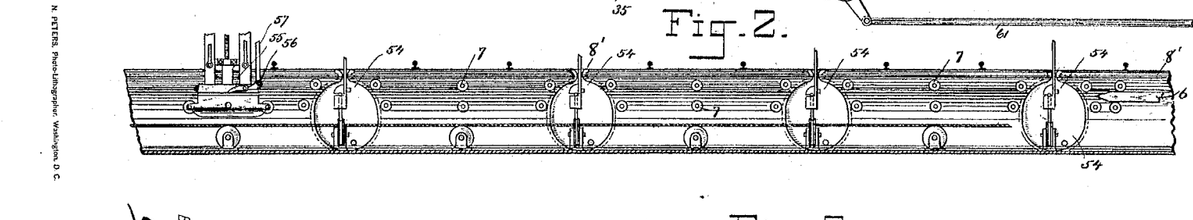

At the crossings I employ a long tongue or strip, 6, which is supported at its upper and lower edge between grooved wheels or rollers 7, journaled to brackets 8, which latter are secured to the inner wall of the cable-tunnel and a little to one side of the slot-rail 8'.

Figure 3:
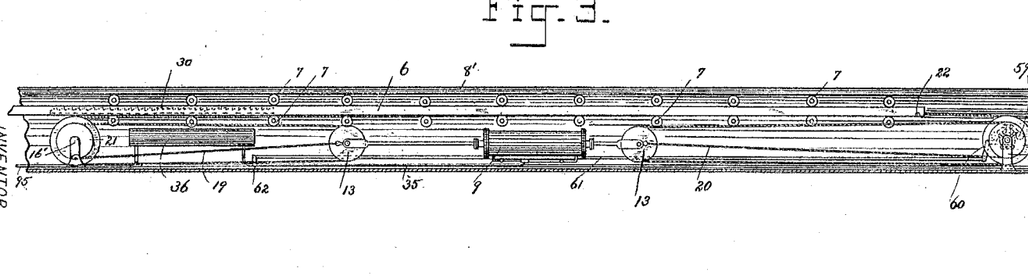
Fig. 3 is a continuation of the cross-tunnel shown in Fig. 2, it being broken off of the right-hand end of the latter, showing the engine or cylinder and the series of pulleys or sheaves and cables for imparting motion to the tongue.

9 is a cylinder containing a piston, to which is secured a piston-rod, 10, projecting from both ends of said cylinder, and each having secured to its outer end a bracket, 11, in which is journaled a pintle, 12, on each of which are journaled a number of independently-revoluble sheaves, 13. In the present instance I show five of said sheaves on each pintle. Also journaled on each of these pintles 12 are two track wheels or rollers, 14, one on each side, which rest on and traverse the tracks 15, for the purpose of supporting and guiding the piston-rod 10.

Before and aft of the cylinder 9 are fixed to the floor of the tunnel standards 16 16', the former being planted rigidly in the floor, and the latter, 16', being hinged or pivoted to a stationary block, the object of which will be presently described. Mounted in each of these standards is a series of sheaves, 21, equal in number to the sheaves on either of the pintles 12. In holes 17 18 in the outer ends of the brackets 11 is secured one end of each of the cables 19 20, respectively. The cable 19 passes around each of the sheaves in the series 13 21 at one end of the cylinder 9, and then passes between a groove in the bottom of the tongue 6 and in the upper part of the peripheries of the lower rollers, 7, and is connected at 22 to the butt-end of the tongue. The cable 20 is in like manner secured in the hole 18 of the bracket 11 and passes around each of the sheaves in the series 13 21, at the other end of the cylinder, and its other end, 23, is also secured to the butt-end of the tongue at 22. Thus the length of the thrust of the tongue is increased as many times the length of the piston-stroke as there are folds in the cable multiplied by two, and in this way I am enabled to operate the tongue at a very wide crossing or a long curve with a comparatively short cylinder. As before stated, the standards 16' are pivoted to a stationary block in the tunnel. This is done for the purpose of allowing the slack of the ropes or cables 19 20 to be taken up by a tightener.

Figures 14, 15:
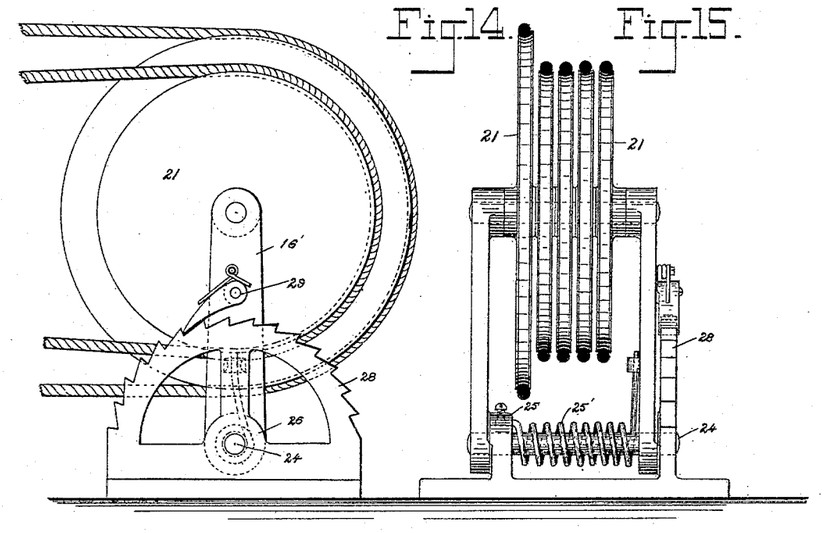
Figs. 14 and 15 are respectively a side and end elevation of my improved cable-tightener.

The shaft 24, to which the lower ends of the standards 16' are keyed, Figs. 14 and 15, is journaled in boxes 25 and 26 on said stationary block, and around this shaft is coiled a stout spiral spring, 25', whose one end is secured or abuts against one of the standards, while the other abuts against or is secured to the box 25. Secured to the upper part of the stationary block is a semicircular ratchet, 28, and pivoted to the standard on this side is a pawl, 29, which is adapted to engage said ratchet, as shown. It will now be seen that the spring 25' will hold the cables 19 20 normally taut, and should they stretch, the spring will immediately take up the slack, and in doing so the pawl will drop behind another ratchet-tooth and hold the sheaves to the position gained by the spring. This tightener is principally for the purpose of taking up the slack caused by the stretching of new cables. After the cables have been used for a while they will cease to stretch, and the pawl will not be able to gain more than a notch in a year by the giving of the cables.

It will be seen by referring to the transverse section of the tunnel that this tongue 6 and the grooved rollers in which it runs are situated as high as the grip is when elevated, but a little to one side of the same, so as not to interfere with it or with the traction-cable.

Bolted or otherwise secured to the tongue 6 is a rack or ratchet, 30, which is situated near the forward end of said tongue and is of a length equal to about one-fifth the length of the latter. This rack or ratchet may be composed of several sections, each of which is bolted to the tongue 6, and located a short distance from each other in order to allow the said tongue when used at curves and switches to bend in conformity with the curve; but in cases where the tongue is to be used in a straight course the ratchets may be formed in a single bar. Extending downwardly from the two ports of the cylinder 9 are two pipes, 31 and 32, having communication with valves 33 34, respectively.

35 is a supply-pipe extending from the high-pressure-fluid reservoir 36, (see Fig. 3,) and connected with this pipe and with the valves aforesaid are two pipes, 37 38, having therein valves 39 40, operated by crank-arms 41 42, which are connected to rods 43 44. Connected to the projections on the tracks 15 and to the said rods are springs 45 46, which tend to hold the valves 39 40 normally open. These valves 39 40 are for the purpose of preventing the pistons from "knocking" in the ends of the cylinder by reason of the continued pressure, which, if not shut off, would increase until the pressure on the interior of the cylinder would be as great as that at the source of production, which valves are caused to close by the downwardly-projecting lugs 58 on the pistons coming in contact with the ends of the rods 43 44 alternately as the piston reciprocates, and thus closing first one and then the other of said valves, which are again opened by the springs 45 46, when the piston-rods make the outward stroke. The valves 33 34 are also provided with crank-arms 47 48 for operating them, which are pivoted to a rod, 49, extending along the tunnel, and which is pivoted at its end to an operating-lever, 51, at the station or other place where the operator may have his post.

Figures 12, 13:
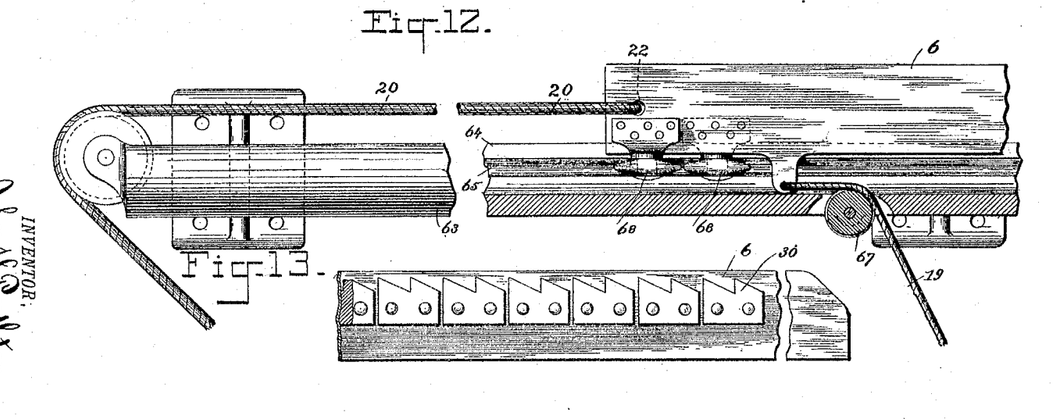
Fig. 12 is an enlarged view of the butt-end of the flexible tongue used at curves and switches, showing a portion of its guide-track in section.
Fig. 13 is an enlarged detail view of the front end of the flexible tongue with the ratchets secured thereto.

The operation of these parts is as follows: Supposing the parts to be in the position shown in Fig. 7 of the drawings, if the lever 51 is oscillated in the direction of the cylinder, the valve 33 will be opened and place the port-pipe 31 and pipe 37 in communication, and at the same time the valve 34 will be closed and place the port-pipe 32 and exhaust-pipe 53 in communication. This operation will of course drive the piston to the right, lengthen the ropes or cables between the sheaves 13 21 at one end of the cylinder, and shorten the distance between the sheaves at the other end, and the cable 19, being connected to the butt-end of the tongue 6, (see Figs. 3 and 12,) will cause said tongue to thrust forward transversely through the up-and-down tunnels 54, and place the ratchet 30 directly under the grip of the car on the opposite side of the up- and-down tracks to be conveyed across.

Secured to the grip is a pawl, 55, which has a weighted end, 56, for the purpose of holding it normally aloof. Pivoted to this pawl is a rod, 57, which extends upward and is connected with any suitable operating mechanism at the place where the operator stands. Now, when a car is approaching such crossing, the traction-cable is dropped from the grip at a considerable distance from the cross-tracks, and the station-operator sends the tongue 6 across to meet the car, and when the operator on the car receives the proper signal he causes the pawl to engage with the ratchet-bar 30 and signals the station-operator, who then oscillates his lever in the opposite direction, and the tongue is caused to tow the car across, whereupon the pawl is forced out of engagement or leaves the ratchet automatically by reason of the pressure being relieved on the point of the pawl and allowing the counter-balance to raise it. The traction-cable is resumed by the grip, and the tongue remains where it is left, out of the way of the cross-car's grips.

It will be noticed that the pipe 37 is of considerably less diameter than the pipe 38. This is because the pressure through said pipe 37 is merely for sending the tongue across, while the other pipe has to stand pressure sufficient to draw the car. So, also, the cables 19 20 may be, if desired, of different size, (see Fig. 12,) the former being the smaller, as it merely pulls the tongue.

For preventing the engine from whipping the tongue across the tracks too rapidly, I provide a suitable governor, 59, which is supported on the rigid standard 16 and is operated by a bevel-gear on the end of the sheave-pintle, one of said sheaves being keyed to the pintle, and is so arranged that when the balls rise by rapid rotation the bell crank 60 will be operated, which will draw upon the long rod 61 and close a valve, 62, in the feed-pipe 35, shutting off the extra pressure. The mechanism by which I accomplish this end I have fully shown and described in detail and broadly claimed certain of its features in this application; but it is specifically described and claimed in my application, Serial No. 258,347, filed herewith.

At switches and other points where the tracks diverge I employ the same operating-engine and mechanism just described, with the exception of a slight change in the track for guiding the tongue 6 and that the latter is flexible in order to allow of its bending in conformity with the track. In such instance the track employed for guiding the flexible tongue is a curved trough-like piece, 63, having on both sides overhanging flanges 64, (shown in cross-section in Fig. 6,) which form two grooves, 65, one on each side of said track. The cable 19 in this instance lies in a groove, 66, in the bottom of the track, and runs over an idle roller or pulley, 67, mounted in a slot in the track at a point at which the track begins to diverge or directly over the sheaves in the standards 16'.

The flexible piece in practice is preferably composed of steel or some other suitable tough and flexible metal, and is about one-fourth of an inch in thickness and from eight to ten inches in breadth, and it is provided on both sides with rollers or wheels 68, which are journaled to both sides of the tongue 6 and bear on their respective sides in the grooves 65. For the sake of brevity it will be here stated, however, that in all cases the operating mechanism is arranged entirely in the straight portion of the tunnel, and the flexible tongue is projected forward around the curves and through the cross-over tracks and cross-tunnels.

Figure 5:
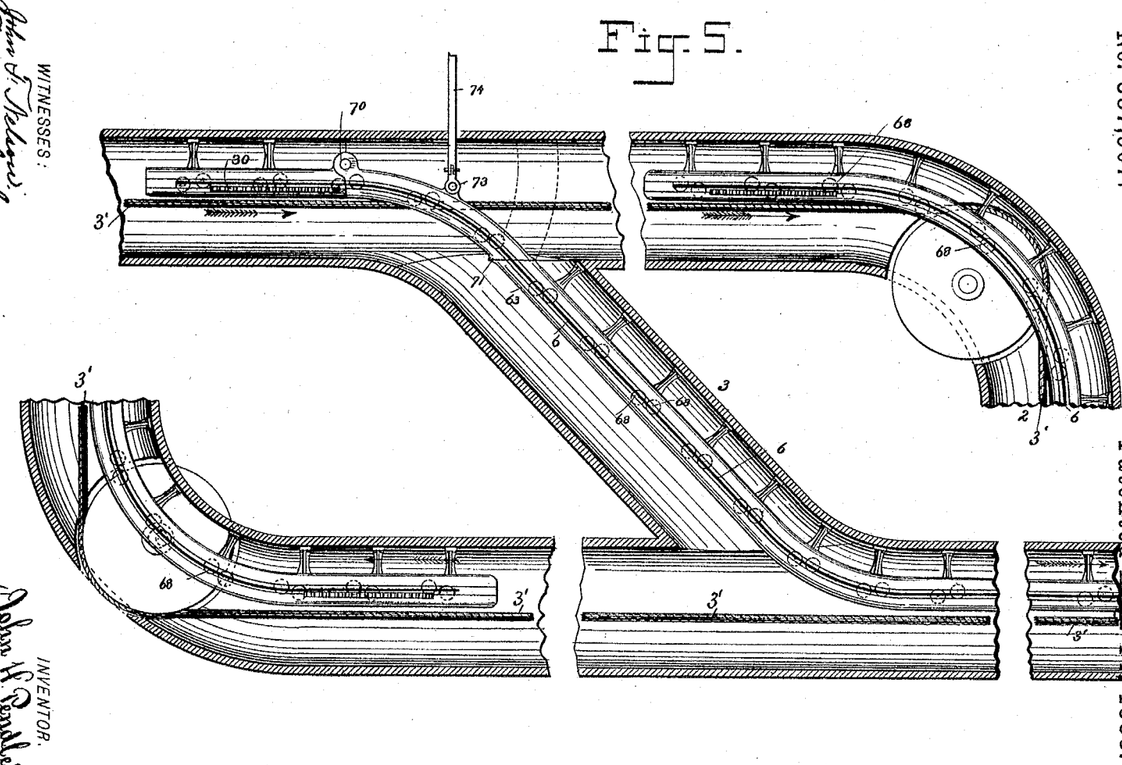
Fig. 5 is a longitudinal section of the cable-tunnel arranged in curved and branch tracks and having my improvements therein, the engine for operating the tongue being omitted.
Figures 8, 9, 10:
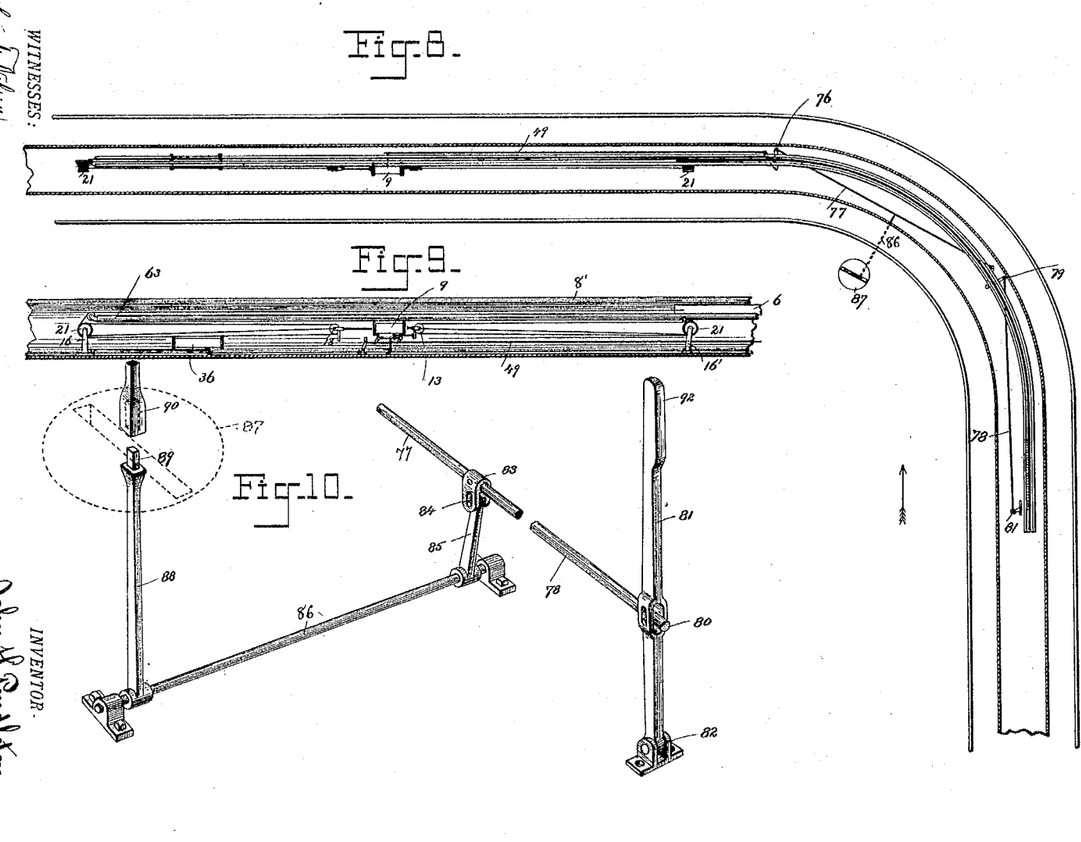
Fig. 8 is a plan view of the automatic arrangement for drawing the cars around curves.
Fig. 9 is a side elevation of a portion of the same, only showing the cable-tunnel in which the mechanism is located in vertical longitudinal section.
Fig. 10 is a detailed perspective view of a portion thereof.

In Fig. 5 the arrangement is shown as applied to a cross-over from one track to another, in which case the guide-track 63 passes from the inside of the cable of one track, out through the switch, and across to the outside of the cable of the other track, so as to bring the ratchet on the side with the pawl on the grip in both positions. Now, it will be seen that the guide-track 63 crosses the cable and the path of the grip on one track, and if it remained so would interfere with the passing cars. Hence I hinge the guide-track 63 at 70 and disconnect it at 71, and at 73, I pivot a rod, 74, which is operated in unison with the switch mechanism. As shown in Figs. 1 and 1ª, the rod 74, which is attached to the hinged section of the guide-track, is attached to the end of a crank-arm, 74', which is actuated by a rock-shaft, 74ⁿ, also having a short crank-arm, 75, which is pivoted to the switch-operating bar, 75', so that when the switch is closed to permit a straight passage on the main track the hinged portion of the guide-track will be swung back out of the way of the grip, as shown in dotted lines in Fig. 5.

The device placed at the curves is automatic, and is caused to operate by the approaching of the car.

As shown in Figs. 8, 9, 10, and 11 of the drawings, the rod 49, to which the crank-arms 47 48 are pivoted for operating the valves 33 34, extends along the floor of the tunnel to a bell-crank lever, 76, which is located at the point where the curve begins, and from this point to the end of the curve, the said rod is composed of two joints, 77 78, one of which extends across and segregates the curve and is connected to the other one, 78, by a bell crank, 79. The joint 78 is pivoted at 80 to a vertical lever, 81, which is itself pivoted at 82 in the floor of the tunnel.

Secured to the joint 78 is a collar, 83, which has downwardly-projecting pieces provided with slots 84, between which pieces and in said slots is pivoted an upwardly-projecting crank-arm, 85, secured to a horizontal rock-shaft, 86, which extends along under ground to a man-hole, 87, which is situated to one side of the track, and has at this end an upwardly-projecting lever, 88. This lever does not project beyond the top of the man-hole; but it is provided with a key-post, 89, on which a key, 90, may be fitted for oscillating the lever.

Figure 4:
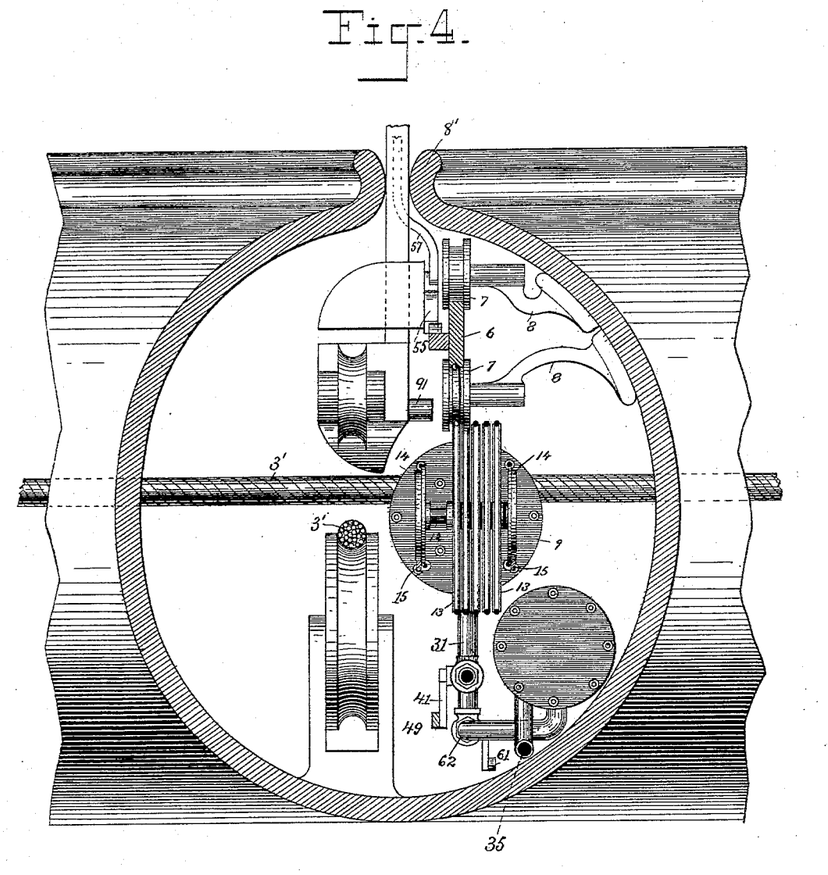
Fig. 4 is an enlarged detail view in cross-section of the cable-tunnel, showing the cable of the cross-road extending transversely through it.
Figure 16:
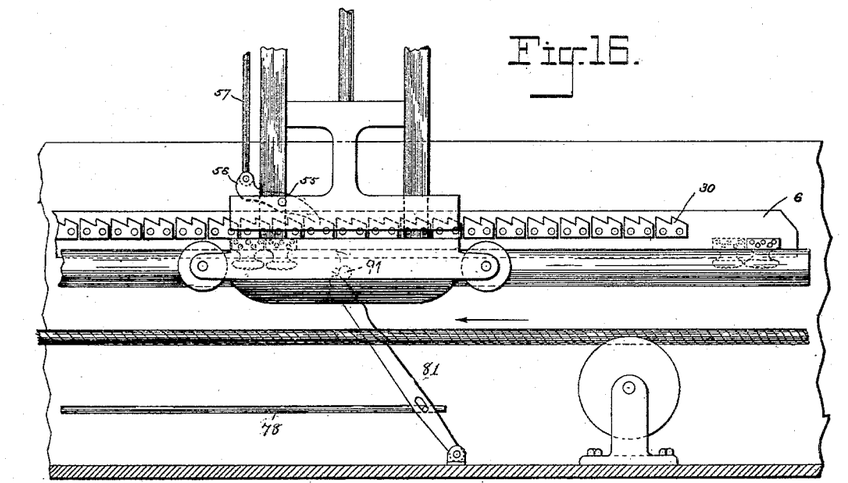
Fig. 16 is an enlarged detail view showing the manner in which the grip automatically operates the mechanism at the curves, and also the pawl engaged with the ratchet.

The rod 49 is operated ordinarily by a pin, 91, Figs. 4, 16, on one side of the grip, coming in contact with the cam 92 on the upper end of the lever 81, which causes the rod to push forward and operates the valves; but in case the track should become obstructed and necessitate the halt of the car the operator would be obliged to disengage the pawl and ratchet and permit the tongue 6 to go around the curve by itself, which, however, immediately returns again to the place from which it started by reason of mechanism presently to be described; and when it may be desired to have the same again put in motion to convey the car the balance of the way around, the conductor would place his key 90 on the lever 88 in the man-hole, slightly operate the lever in the proper direction, and by this means open the valve in the cylinder slightly and cause the ratchet-rack 30 to approach the car gradually from the rear until it struck the pawl on the grip, whereupon the conductor throws the valve in the cylinder fully open and jumps on his car, which will be towed around the curve the same as if he had not released the pawl from the ratchet.

Figure 11:
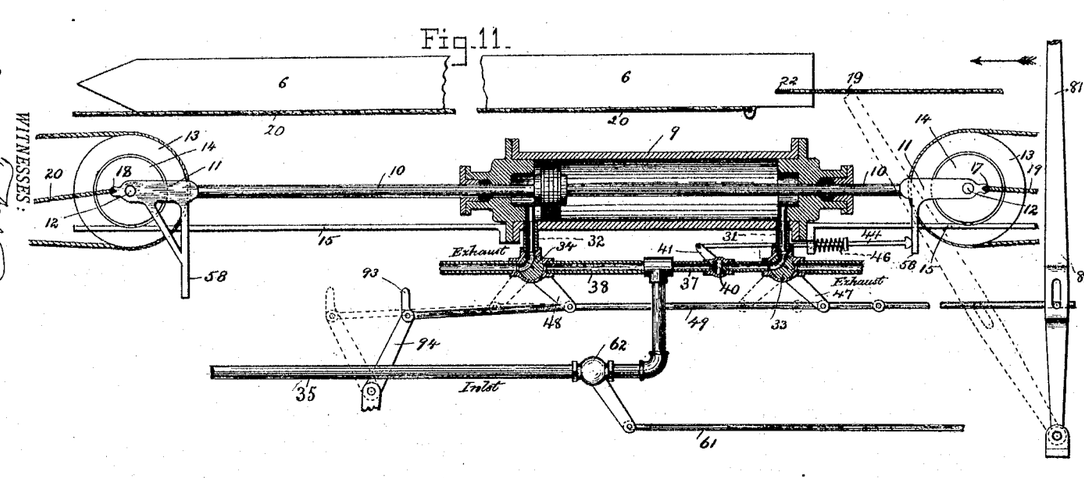
Fig. 11 is a view of the engine, partly in section, for automatically operating the tongue at curves, showing its relation to the flexible tongue.

As before stated, this tongue remains normally projected around the curve to receive the car upon its approach. This automatic return of the tongue is accomplished by slight changes made in the engine, as shown in Fig. 11. An engine similar to this is also shown and described in my application, Serial No. 258,351, filed herewith.

For the sake of illustration we will suppose the car to be coming in the direction of the arrow and the parts to be in the positions shown in Fig. 11, in which case the tongue 6 would be projected around the curve in position to receive the car. When the car approaches and the pin 91 on the grip comes in contact with the cam 92 on the vertical lever, the latter will be pushed forward, as shown in dotted lines, and at the same time the valve 34 will be opened by virtue of its connection with said lever and permit the pressure to enter this end of the cylinder and force the piston toward the other, which will draw the tongue and car from around the curve, and as soon as the stroke of the piston is nearly completed the arm 58 will come in contact with a lug, 93, on the end of an extension of the rod 49, which extension is supported by a link, 94, and cause the valves to operate in the reverse direction, shutting off communication from the feed through the valve 34 and opening communication through the valve 33, which allows the pressure to force the piston back again, and consequently returns the tongue 6 around the curve in readiness to receive the next car, and at the same time returns the lever 81 to a vertical position, the other arm, 58, coming in contact, when the stroke is nearly finished, with the end of the rod 44, compressing the spring 46 and closing the valve 40, whereby the pressure is instantly shut off, and the engine remains in this position until the lever 81 is again struck by the pin on the grip. The mechanism by which this is accomplished is fully shown and described in detail, and certain of its features are covered generically by the claims in this application; but it forms the specific subject-matter of the claims of my application, Serial No. 258,346, filed herewith.

From Fig. 1 it will be seen that I supply all of the engines by a single pipe, 95, which runs from the main plant 96 up one tunnel and down the other. As a pressure-fluid I employ either air, steam, or water.

Having thus described my invention, the following is what I claim as new therein and desire to secure by Letters Patent:

1. In a cable railway, the combination, with the main plant for compressing fluid and with engines having reciprocating pistons located at curves, crossings, and cross-over tracks, of auxiliary reservoirs located in the vicinity of said engines and connected therewith, a conduit or pipe leading from said plant and connected with the said reservoirs throughout the line of road, and a tongue or strip guided by suitable ways and being connected with said pistons, whereby the motion of the latter is imparted thereto, substantially as and for the purposes set forth.

2. In a cable railway, the combination, with the plant for supplying fluid under pressure, of cylinders located at the curves, crossings, and cross-over tracks, having valves and ports and suitable mechanism for operating said valves, pistons in said cylinders, having their rods projecting from both ends of the latter, guideways arranged parallel with the tracks, tongues or strips arranged in said guideways, stationary pulleys, cables running over said pulleys and connected with said piston-rods and the tongues or strips, and a pipe or conduit leading from said plant and having communication with the valves of all of said cylinders, substantially as and for the purpose described.

3. The combination, with a pawl secured to the car, of the tongue or strip having means for engaging with said pawl, cables connected to one end only of said tongue, and means for drawing said cables in opposite directions, whereby the tongue is reciprocated, substantially as described, and for the purposes set forth.

4. The combination, with the cable-grip of the car, of a pawl pivoted thereto, a tongue or strip, a ratchet or rack on said tongue for engaging with said pawl, a suitable track for guiding said tongue, two cables secured to one end of said tongue and running in opposite directions, and means for imparting motion to said cables, whereby the tongue may be reciprocated, substantially as and for the purposes set forth.

5. The combination, with the cylinder having a piston and a rod projecting from both ends, of valves for communicating with the ports of said cylinder, an operating-rod connected with both of said valves, whereby one is closed when the other is opened, a tongue or strip, guides for said tongue, fixed pulleys at each end of said cylinder, and cables passing around said pulleys and connected with the said piston-rods and to the said tongue or strip, substantially as and for the purposes set forth.

6. In a cable railway, the combination, with the cylinder having ports with valves therefor, of a piston in said cylinder, a tongue or strip connected with said piston, a track or guide for guiding said tongue parallel with the rails, and an operating-rod pivotally connected with said valves and extending around the curve and pivoted to an operating-lever, said rod consisting of a number of sections connected together, as and for the purpose set forth.

7. In a cable railway, the track 63, having a hinged section, substantially as shown, and for the purposes set forth.

8. In a switch or branch track in a cable railway, the combination, with the main track and branch track or switch, of the guide-track 63, extending from one of said railway-tracks up the other and having a removable section hinged at 70 at the point where it passes from one track to the other, and a rod, 74, connected to said section and to the switch mechanism, whereby said section will be vibrated in unison with the switch, substantially as and for the purposes set forth.

9. The combination, with the cable-tunnel, of a grooved track extending parallel therewith and supported therein by means of brackets, a tongue, and wheels or rollers journaled to both sides of said tongue and fitting in said grooved track, substantially as and for the purposes set forth.

10. The tongue or strip having plates bolted to both sides and having journals and wheels mounted on said journals, substantially as and for the purposes set forth.

11. The combination, with the track 63, having upwardly-projecting edges with longitudinal grooves therein, of a tongue or strip, journals secured vertically on said tongue, and beveled-edge wheels mounted on said journals and fitting in said grooves, substantially as and for the purposes set forth.

12. The combination of the tunnel, the brackets secured therein, and the track 63, supported by said brackets.

13. The combination, with the tongue 6, having journals secured vertically thereto, of a track having projecting edges with longitudinal grooves therein, wheels mounted on said journals and fitting in said grooves, and a ratchet on said tongue, substantially as set forth.

14. The combination, with the cylinder having a reciprocating piston, of a cable, 20, attached to said piston, a grooved track having a channel in its bottom supported above said cylinder, a flexible tongue supported on its edge in said track by horizontal wheels journaled to both sides of said tongue and fitting in said grooved track, a pulley mounted in said track below the tongue, and a cable, 19, connected with said piston and extending over said pulley and up said channel and secured to the end of said tongue, substantially as and for the purposes set forth.

15. The combination, with two piston-rods, of a tongue, a track for said tongue, fixed sheaves, sheaves carried by said piston-rods, pulleys mounted in said track, cables secured to said tongue and passing over said pulleys, and said traveling and fixed sheaves being rove with the cables, and the cables being also connected to the pistons, substantially as and for the purposes set forth.

16. In a cable railway, the combination, with the engine having a reciprocating piston-rod and an inlet or supply pipe, and with the grip of the car, having a pawl pivoted thereto, of a longitudinal track extending parallel with the rod and a tongue or strip supported by said track and connected with said piston, whereby it is reciprocated therewith, a ratchet on said tongue for engaging said pawl, a valve in said supply-pipe, and a governor operated by the piston and adapted to actuate the said valve, substantially as and for the purposes set forth.

17. The combination, with the cylinder having a piston therein, of piston-rods in both ends of said cylinder, sheaves 13 on said rods, a tongue or strip, a track for said tongue, the sheaves 21 beyond both ends of said cylinder, cables attached to said tongue and passing around said sheaves 13 21, a supply-pipe, valves 33 34, adapted to communicate with the cylinder-ports, pipes 37 38, leading from said supply-pipe to said valves, a valve in each of said pipes 37 38, an operating-rod connected with said valves and springs for holding the same normally open, an operating-rod connected with the valves 33 34, whereby one is opened and the other is closed, and lugs or arms 58 on the pistons for alternately forcing the valves closed in the pipes 37 38 as the piston reciprocates.

18. The combination, with the strip or tongue, the car, and the engine having a throttle-valve, of a cable connected to said strip and engine for imparting motion to the former and a governor operated by said cable for actuating said throttle-valve, substantially as set forth.

19. In a cable-tightener, the combination, with the cable and pivoted standards 16', of sheaves on which the cable is rove mounted in said standards, a stationary ratchet, a pawl pivoted to said standard and adapted to engage with said ratchet, and a spring for forcing said standards in one direction, substantially as and for the purposes set forth.

20. The combination, with the traveling sheaves 13 and the sheaves 21, of pivoted standards in which the latter sheaves are mounted, a tongue, 6, a cable rove on said sheaves and secured at one end to the tongue 6 and at the other to the pintle 12, a stationary ratchet, a pawl pivoted to the standard and adapted to engage said ratchet, and a spring adapted to bear against said standards and tend to increase the distance between the sheaves 13 21, substantially as and for the purposes set forth.

J. H. PENDLETON.

Witnesses:
F. A. HOPKINS,
HERBERT KNIGHT.